United States Patent
Ablett et al.

[19]

[11] Patent Number: 6,138,896

[45] Date of Patent: Oct. 31, 2000

[54] SUPERSPEED INERTIA WELDING

[75] Inventors: Adrian M. Ablett, Cincinnati; Charles W. Carrier, West Chester; Brian J. Humke, Cincinnati; Steven A. Strang, Loveland, all of Ohio

[73] Assignee: General Electric Company, Cincinnati, Ohio

[21] Appl. No.: 09/166,239

[22] Filed: Oct. 5, 1998

[51] Int. Cl.[7] ............................ B23K 20/12; B23K 31/02

[52] U.S. Cl. ...................... 228/113; 228/112; 228/114.5

[58] Field of Search .................... 228/113, 114.5, 228/112

[56] References Cited

U.S. PATENT DOCUMENTS

| | | | |
|---|---|---|---|
| 3,185,368 | 5/1965 | Holloway et al. | 228/113 |
| 3,234,644 | 2/1966 | Hollander | 228/113 |
| 3,235,162 | 2/1966 | Hollander | 228/113 |
| 3,460,734 | 8/1969 | Vill et al. | 228/2.3 |
| 3,571,905 | 3/1971 | Calton et al. | 29/470.3 |
| 3,591,068 | 7/1971 | Farmer et al. | 228/2 |
| 3,597,832 | 8/1971 | Calton et al. | 29/470.3 |
| 4,798,320 | 1/1989 | Fang | 228/122 |
| 5,248,078 | 9/1993 | Deal et al. | 228/113 |
| 5,342,496 | 8/1994 | Stellrecht | 204/298.12 |
| 5,498,186 | 3/1996 | Benz et al. | 445/28 |
| 5,498,187 | 3/1996 | Eggleston et al. | 445/28 |
| 5,548,628 | 8/1996 | Eggleston et al. | 378/125 |
| 5,655,000 | 8/1997 | Benz et al. | 378/144 |

OTHER PUBLICATIONS

Bangs, "Inertia Welding for Fuel Mandrels," Welding Design & Fabrications, Jun. 86, 4 pages.

Production Technology Inc., "Inertia Welding Application Principles," 1974, 2 pages.

Heberling, "Building Strong Bonds with Inertia Welding," Machine Design, Dec. 1990, 5 pages.

*Primary Examiner*—Patrick Ryan
*Assistant Examiner*—Zidia T. Pittman
*Attorney, Agent, or Firm*—Andrew C. Hess; Gerry S. Gressel

[57] ABSTRACT

First and second superalloy workpieces are inertia welded together by rotating the first workpiece to an initial contact speed greater than about 750 surface feet per minute, and frictionally engaging under a weld load the first and second workpieces to effect an inertia weld therebetween.

20 Claims, 2 Drawing Sheets

SUPERSPEED INERTIA WELDING

BACKGROUND OF THE INVENTION

The present invention relates generally to inertia welding, and, more specifically, to inertia welding of superalloys.

Superalloys have been developed for use in aircraft gas turbine engines in order to withstand the hostile, high temperature environment therein while enjoying a suitable useful life during operation. A typical superalloy for turbine engines is high strength, heat resistant, nickel-based alloy known under various commercial designations including Inconel, Waspaloy, Hastelloy, and Rene in various alphanumeric designations. These superalloys also have corresponding industry designations under the AMS specifications.

These superalloys have specific microstructures associated with effecting substantially high material strength at the high, elevated temperatures in gas turbine engines subject to the hot combustion gas flow therein. Both rotor and stator components in the engine are subject to the hot combustion gases under heavy loading and high levels of stress during engine operation. The use of superalloys in these parts accommodates the hostile environment for effecting a suitable useful life thereof.

Relatively large superalloy components in an engine are typically stator components including for example, combustor, turbine, and compressor structural casings and pressure vessels which may have outer diameters in the exemplary range of 10–80 inches. Rotor components, such as the blades and supporting disks, are correspondingly smaller in diameter.

The rotor and stator superalloy components must be manufactured for the specific size and configurations thereof while maintaining the integrity of the superalloy material itself without introducing defects or loss of strength therein.

Furthermore, various components of the engine must be fixedly joined together, such as by welding. Typical forms of welding locally melt the parent material and are not useful for welding superalloys in view of the attendant change in microstructure thereof which significantly reduces their high temperature strength capability. Superalloy components are therefore typically welded using inertia welding in which the parent material is not melted.

In inertia welding, a first workpiece is rotated to a specific speed and then a second workpiece is forced into frictional engagement with the first workpiece with frictional heat being generated to weld together the two components without melting in the contact region. Inertia welding is a forging process which requires elevated forging temperatures for the specific material. An upper forging temperature is typically the melting temperature for the material which must not be reached in inertia welding superalloys in view of the resulting change in microstructure thereof. A lower forging temperature is the minimum temperature at which an inertia weld will in fact be effected.

Many conventional materials have wide forging temperature ranges and are readily inertia weldable using conventional inertia welding machines. However, the available inertia welding range for superalloys is relatively small, for example about 200° F. or less for nickel-based superalloys, which presents a critical problem in welding superalloys since unless the inertia welding is precisely effected, resulting damage to the welded components results rendering them useless. Since superalloy engine components are substantially expensive, the failure to properly inertia weld even one component is quite costly.

Accordingly, less expensive, and relatively small engine rotor components have been successfully inertia welded after the specific process parameters have been determined therefor in qualification testing with a corresponding expense.

A typical inertia welding machine includes first and second opposed heads to which the first and second workpieces may be fixedly attached in opposition to each other. The first head is rotatable and is powered by a suitable motor for rotating the head and first workpiece to a precise rotational speed. The second head is non-rotatable and simply supports the second workpiece.

The first head includes one or more flywheels to provide the rotary inertia for effecting welding of the two workpieces. The second head is axially translatable by a powered piston which engages together the first and second workpieces under a substantial compressive weld load. The second workpiece therefore frictionally engages and brakes the rotating first workpiece creating friction heating at the contact area therebetween which raises the temperature thereof to effect an inertia weld without melting.

There are only four control variables in inertia welding. These include the workpiece geometry such as size and configuration; the applied weld load and corresponding weld stress at the contact area of the two engaged workpieces; the initial contact speed of the two workpieces typically represented as the surface velocity at the contact area which is based on the rotary speed and radius at the contact area; and, lastly, the unit energy input at the contact area based on the mass moment of inertia of the flywheel typically represented by a flywheel function which is the product of the flywheel weight and the square of the radius of gyration.

The precise inertia welding process parameters for various high strength turbine alloys have been developed over years at substantial cost. Since turbine rotor components are critical to overall engine performance, reliability, and life, absolute compliance with proven process parameters is required to ensure effective inertia welding without incipient melting which would alter the required microstructure of the materials and correspondingly decrease their strength rendering them unusable in the engine. For example, typical critical rotating engine components include fan, compressor, turbine, and shaft components formed of nickel-based superalloys such as Inconel 718, Rene 95, and Rene 88.

The historically proven process parameters for these superalloys include a welding stress within the range of 25,000–70,000 psi; a unit energy input within the range of about 25,000–90,000 ft.-lb/sq. in.; and an initial contact speed measured in surface feet per minute in the preferred range of about 400–550 SFM, and not exceeding 750 SFM to prevent weld defects including incipient melting.

A typical inertia welding machine is limited in size, and therefore cannot accommodate many of the large components found in gas turbine engines. The operational size limit may relate to one or more of several process parameters such as energy (including flywheel limitations), physical external dimensions of the workpieces being welded, cross sectional area of the welded surfaces, machine speed (in terms of rotational speed and/or surface velocity), contact pressure, and others.

Accordingly, inertia welders are typically used for welding the relatively smaller rotor components as opposed to the larger stator components. The stator components must, therefore, be otherwise joined together which is typically effected using other manufacturing processes such as large diameter one-piece investment castings; seamless one-piece large diameter rolled forgings; or fabrications using other types of welding processes.

However, these manufacturing processes have one or more disadvantages when used to produce large stator components of a gas turbine engine including time consumption; expense; higher defect levels; and difficulty in precisely controlling the inertia welding parameters. Furthermore, some high strength materials for large turbine stator components cannot be fabricated with conventional processes. For example, the nickel-based superalloy known as Waspaloy cannot be investment cast, and is not easily weldable to the levels of quality and integrity required for gas turbine use.

Accordingly, it is desired to provide an improved inertia welding process for the fabrication of large, superalloy stator components of a gas turbine engine using commercially available inertia welding equipment.

BRIEF SUMMARY OF THE INVENTION

First and second superalloy workpieces are inertia welded together by rotating the first workpiece to an initial contact speed greater than about 750 surface feet per minute, and frictionally engaging under a weld load the first and second workpieces to effect an inertia weld therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
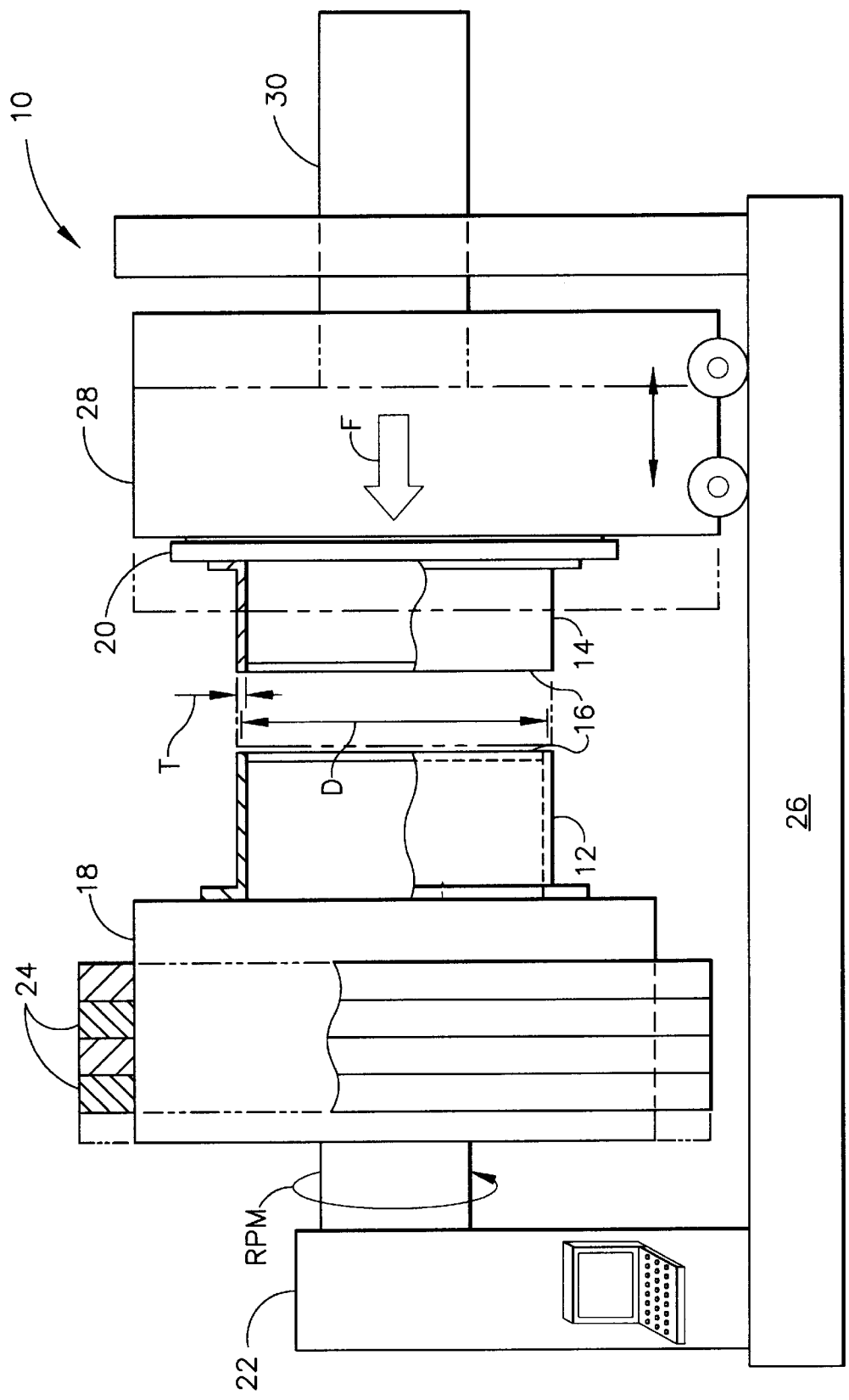
FIG. 1 is a schematic representation of a conventional inertia welding machine operated in accordance with a new method of the present invention.

Illustrated in FIG. 1 is an inertia welding machine 10 for inertia welding together first and second workpieces or parts 12, 14 which may have any suitable configuration. In the exemplary embodiment illustrated, the workpieces are annular members which are inertia welded together for use as combustor, turbine, or compressor structural casings or pressure vessels in an aircraft gas turbine engine. The workpieces are coaxially aligned with each other and have opposing weld preps or contact areas 16 at which inertia welding is effected. The weld preps 16 have an average diameter D and a weld prep thickness T.

The machine 10 includes a first rotary head 18 to which is suitably fixedly attached the first workpiece 12, and a second head 20 to which the second workpiece 14 is suitably fixedly attached. The first head 18 is operatively joined to a suitable motor 22, such as a hydraulic motor, for being rotated during operation at a suitable rotary speed expressed in revolutions per minute (RPM). Suitably attached to the first head are one or more annular flywheels 24 which are selectively used for controlling the rotary mass moment of inertia of the first head for effecting inertia welding energy.

The motor and first head are suitably attached to a supporting frame 26 at one end thereof, and the second head 20 is carried by a suitable truck or carriage 28 on the opposite end of the frame 26. The second head 20 is not rotatable on the truck 28, and the truck 28 is operatively joined to a hydraulic piston 30 which is configured for translating the truck 28 horizontally atop the frame 26 for engaging the first and second workpieces at the weld preps 16 under a specific weld load or force F, expressed in pounds for example.

The inertia welding machine 10 illustrated in FIG. 1 is conventional in configuration and basic operation, and in an exemplary embodiment is commercially available from the Manufacturing Technology Inc. (MTI) company, of South Bend, Ind., under Model 800.

In inertia welding, the first head 18 and attached first workpiece 12 are accelerated to a predetermined rotary speed, and then the piston 30 is actuated to drive the truck 28 and attached second workpiece 14 in frictional engagement with the first part at the weld prep 16 under a predetermined weld load F. Upon application of the weld load, the motor 22 is disconnected from the first head 18, which in the case of a hydraulic motor is accomplished by simply interrupting the hydraulic pressure, and the inertia of the flywheels 24 imparts energy at the engaging weld preps 16 which undergo frictional heating as the second workpiece 14 frictionally brakes the rotating first workpiece 12.

The friction generated at the weld preps 16 locally increases the temperature of the two workpieces to a temperature below the melting temperature of the workpieces, yet sufficiently high for effecting a forged, friction weld 32 therebetween as shown in the exemplary flowchart of FIG. 2.

Figure 2:
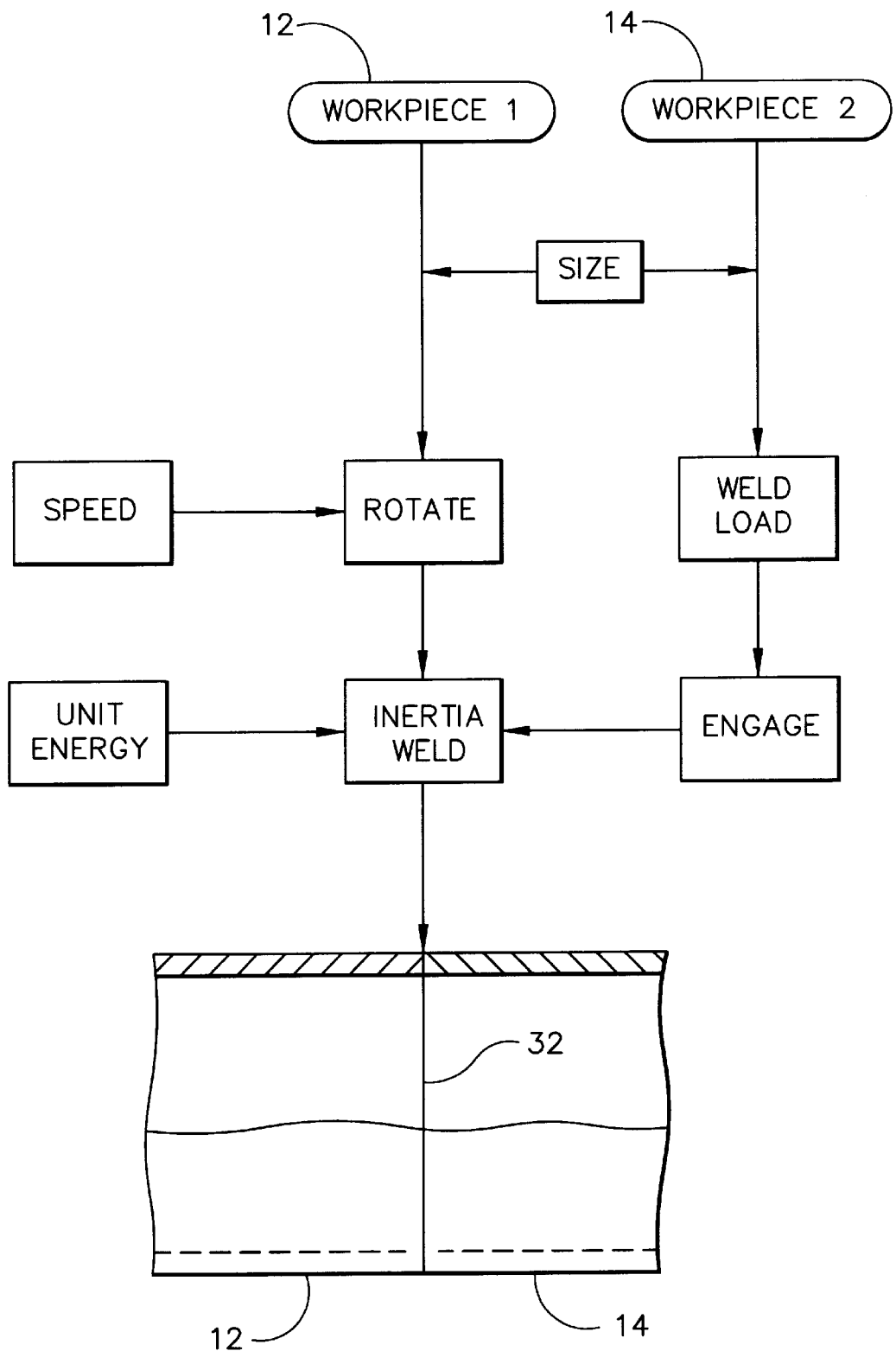
FIG. 2 is a flowchart representation of an improved method of inertia welding superalloy components in accordance with an exemplary embodiment of the present invention.

FIG. 2 also shows the basic process steps in accordance with a preferred embodiment of the present invention for effecting the inertia welding of the two workpieces using the machine 10 illustrated in FIG. 1.

There are four control parameters in effecting an inertia weld. Fundamentally, the geometry, including size and configuration, of the workpieces 12, 14 is one parameter since the inertia weld is effected at the corresponding annular weld preps 16. As indicated above, part size is a factor both for being physically supported in a given type of inertia welding machine, and for the amount of energy required to effect the inertia welding thereof which is dependent on available flywheel inertia.

A second control parameter is the weld load F which is exerted over the weld preps 16 to effect a corresponding weld stress or load per unit area in compression, typically represented in pounds per square inch (psi).

A third control parameter is the unit energy input effected at the weld preps for inertia welding thereat which is typically represented by foot-pounds over the contact area in square inches. The unit energy is effected by the mass moment of inertia of the rotating first head 18 and the attached flywheels 24 which may be adjusted in a finite number of increments by the additional or subtraction of individual flywheels 24.

And, the fourth control parameter is the initial contact speed of the rotating first workpiece 12 at its weld prep 16 typically expressed in surface feet per minute (SFM) which is the product of the circumferential length at the weld prep 16 and the rotary speed expressed in RPM.

In the exemplary embodiment illustrated in FIGS. 1 and 2, the two workpieces 12, 14 are formed of a high strength, heat resistant superalloy material for use in various hot section components of an aircraft gas turbine engine. A typical turbine superalloy is nickel-based and has an exemplary forging temperature range of about 200° F. below the melting temperature thereof.

For example, the superalloy material of the workpieces 12, 14 may be nickel-based and include those commercially available under the trademarks Inconel, Waspaloy, Hastelloy, and Rene which have various alloy designations such as Inconel 718, Rene 95, and Rene 88, all of which have corresponding AMS specifications which are conventionally known.

As indicated above, the inertia welding machine 10 has been commercially used in this country over many years for inertia welding relatively small gas turbine engine rotor components formed of nickel-based superalloys. However, inertia welding of larger gas turbine engine hot section stator components formed of nickel-based superalloys has not been possible because of the operational size limit of the inertia welding machine for imparting sufficient energy to effect a suitable inertia weld. The design and manufacture of larger inertia welding machines to overcome the operational size limit is currently constrained by various technological limitations as a result of which the present invention was made.

For example, the present invention now allows the use of a conventional inertia welding machine for inertia welding relatively large gas turbine engine hot section stator components such as the two workpieces 12, 14 made from nickel-based superalloys. The stator components represented by the workpieces 12, 14 have an average diameter D at the weld preps in a range from about 10 inches to about 80 inches.

In one example, the workpieces 12, 14 are portions of either a combustor casing or low pressure turbine casing which are joined together by inertia welding in accordance with the present invention. In an exemplary combustor casing size, the workpieces have an average diameter at the weld preps of about 42 inches, and the low pressure turbine casing example has an average diameter at the weld preps of about 72 inches. The specific nickel-based superalloy for these exemplary casings is Waspaloy.

In view of the relatively large diameter of the stator components, a suitably large inertia welding machine is required for the inertia welding thereof. The Model 800 inertia welder identified above has the physical size capability, but lacks sufficient flywheel weight to effect inertia welding under the historically proven process parameters. Since the large stator workpieces have a different configuration and greater energy requirement than those previously welded in the machine, corresponding inertia welding parameters are required. Although the size of the components is now given, the remaining three inertia welding parameters, including the weld load, initial contact speed, and unit energy input, must be determined.

The weld load is independent of the other two parameters and is established by calculating the contact area at the beginning of the weld cycle. For the larger of the two stator components, i.e., the low pressure turbine casing having an average diameter at the weld prep 16 of about 72 inches, and a weld prep thickness T of about 300 mils, the contact area is conventionally determined to be 67.9 square inches (sq. in.).

The historically proven weld stress for nickel-based superalloys previously used for turbine rotors is in the range of about 25,000–70,000 psi. The weld stress varies, based on experience, as a function of the wall thickness and the particular superalloy being welded.

Assuming an acceptable weld stress at the minimum of the range, a required weld load of 1,698,000 lbs. is calculated as the product of the stress and contact area. The Model 800 inertia welding machine has a weld load capability of 4,500,000 lbs., with the calculated weld load being well within this capability.

The initial contact speed and unit energy input are functions of the specific alloy being welded and the weld prep contact area as historically proven. They are related as follows:

$$E = WK^2 RPM^2 / 5873A \qquad \text{Eq.(1)}$$

$$RPM = 12 SFM / \pi D \qquad \text{Eq.(2)}$$

Where E is the unit energy input measured in ft.-lb./sq. in.; and $WK^2$ represents a flywheel function or parameter, with W being the flywheel weight and K being the radius of gyration. The initial contact rotary speed is measured in revolutions per minute (RPM); the initial circumferential contact speed is measured in surface feet per minute (SFM) at the average diameter D; and the weld prep contact area A has been determined above.

Historically, the initial contact speed and unit energy input have controlled the size of the parts which could be processed using inertia welding. For superalloys, the unit energy input is limited to the conventional range of about 25,000 to about 90,000 ft.-lb./sq. in.

Furthermore, the initial contact speed SFM for superalloys has been limited to the conventional range of about 400–550 SFM and has not exceeded 750 SFM to prevent poor quality inertia welds due, for example, to microscopic incipient melting along the grain boundaries of the superalloy in the weld joint.

Since the inertia welding of larger workpieces necessarily requires a corresponding increase in energy for effecting the inertia weld, energy may be increased by increasing the initial contact speed and the flywheel moment of inertia. However, this cannot be done randomly in view of the interrelationship of the inertia welding control parameters since an undesirable inertia weld permanently damages the workpieces and wastes substantial money.

Equation (1) may be rearranged for determining the required flywheel size as follows:

$$WK^2 = E5873A / RPM^2 \qquad \text{Eq.(3)}$$

For the specific example above using the maximum initial contact speed of 750 SFM and an exemplary unit energy input of 50,000 ft.-lb./sq. in., Equation (3) requires 12,587,000 lb.-ft.$^2$. The maximum flywheel parameter or inertia available from the Model 800 machine is 1,000,000 for the basic machine and 2,000,000 for a specially configured larger version thereof. In either case, the machines do not have the capability to provide a sufficient amount of flywheel inertia for effecting inertia welding under conventional practice. By adjusting the various parameters in Equation (3) in accordance with conventional practice, the flywheel inertia may be reduced, yet is still substantially greater than the capability of the Model 800 machine.

In accordance with the present invention, the energy Equation (1) may be rearranged as follows:

$$RPM^2 = E5873A / WK^2 \qquad \text{Eq.(4)}$$

And, the rotary speed Equation (2) may be arranged as follows:

$$SFM = RPM \pi D / 12 \qquad \text{Eq.(5)}$$

For an exemplary unit energy input E of 50,000 ft-lb/sq. in. and the contact area of 67.9 sq. in. of the above example, a required rotary speed from Equation (4) of 99.8 RPM is calculated which is within the operational limit of the specific welding machine with all the flywheels 24 installed thereon for obtaining the maximum flywheel inertia of 2,000,000 $WK^2$. Correspondingly, the initial contact speed Equation (5) requires 1880 SFM, which is substantially greater than the 400–750 SFM range according to conventional practice.

In another configuration of the workpieces 12, 14 having an increased thickness T of about 500 mils, and using the minimum unit energy input and maximum flywheel inertia, a rotary speed of about 128.9 RPM may be calculated, which corresponds with an initial contact speed of 2400 SFM, which is even greater yet than the conventional limit.

In accordance with the present invention based on the insight obtained from Equations (4) and (5), and confirmed by sub-scale development testing, an improved method for inertia welding together the first and second superalloy workpieces 12, 14 has been discovered in which the first workpiece 12 may be rotated to an initial contact speed greater than about 750 SFM, and then the second workpiece 14 frictionally engages the rotated first workpiece under a weld load to effect the inertia weld 32 therebetween. This superspeed or supraspeed inertia welding of superalloys is possible by correspondingly adjusting the flywheel parameter.

This discovery extends the inertia welding operating parameters in a new combination for now allowing inertia welding of substantially larger superalloy workpieces, not heretofore possible, without incipient melting or other weld defects. The conventional welding machine 10 may be used for imparting a unit energy input at the inertia weld in the proven range of about 25,000 to about 90,000 ft.-lb./sq. in., and a weld load F within the capability of the conventional machine may be used as defined by the product of the contact area of the workpieces at the weld preps 16 and a weld stress within the proven range of about 25,000 to about 70,000 psi.

The first workpiece 12 is rotated to an initial contact speed SFM which is a function of a product of the unit energy input E and the contact area A divided by the flywheel parameter $WK^2$ as represented by Equation (4) including the constant 5873 therein.

Sub-scale development testing of the improved inertia welding process has demonstrated that the initial contact speed may be as high as about 3000 SFM for effecting acceptable welds in nickel-based superalloys. This significant improvement in inertia welding of superalloys now allows the inertia welding of large gas turbine engine stator components which was previously not possible in a conventional inertia welding machine. Turbine hot section components having average diameters at the weld preps 16 ranging from 10 inches to as high as about 80 inches may now be inertia welded with success.

The improved inertia welding process extends the capability of conventional inertia welding machines beyond the flywheel inertia capabilities thereof by instead preferentially increasing the initial contact speed for effecting the required unit energy input at the inertia weld. The improved process is accurately controlled to consistently produce high quality and high integrity inertia welds in superalloys not before possible. The improved process may now be applied to large superalloy turbine stator components for providing a substantial reduction in cost and manufacturing cycle time therefor.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method of inertia welding together first and second superalloy workpieces comprising:
   rotating said first workpiece to an initial contact speed greater than about 750 surface feet per minute; and
   frictionally engaging under a weld load said first and second workpieces to effect an inertia weld therebetween.

2. A method according to claim 1 wherein said superalloy is a heat-resistant nickel-based superalloy.

3. A method according to claim 2 wherein said first and second workpieces are gas turbine engine hot section components.

4. A method according to claim 3 wherein said first and second workpieces are stator components.

5. A method according to claim 4 wherein said stator components have average diameters in a range from about 10 inches to about 80 inches.

6. A method according to claim 1 wherein said superalloy has a forging temperature range of about 200° F. below a melting temperature thereof.

7. A method according to claim 2 wherein said superalloy is selected from the group consisting of Inconel, Waspaloy, Hastelloy, and Rene.

8. A method according to claim 1 further comprising imparting a unit energy input at said inertia weld in a range of about 25,000 to about 90,000 ft.-lb./sq. in.

9. A method according to claim 1 wherein said first and second workpieces have a contact area, and said weld load is a product of said contact area and a weld stress within a range of about 25,000 to about 70,000 psi.

10. A method according to claim 1 effected using an inertia welding machine having a flywheel parameter being a product of flywheel weight and a radius of gyration squared; and further comprising:
    limiting a unit energy input at said inertia weld in a range of about 25,000 to about 90,000 ft.-lb./sq. in.;
    limiting said weld load to a product of a contact area between said first and second workpieces and a weld stress within a range of about 25,000 to about 70,000 psi; and
    rotating said first workpiece to an initial contact speed being a function of a product of said unit energy input and said contact area divided by said flywheel parameter.

11. A method according to claim 1 wherein said initial contact speed is up to about 3000 surface feet per minute.

12. A method of inertia welding together first and second, heat-resistant, nickel-based superalloy workpieces comprising:
    rotating said first workpiece to an initial contact speed greater than about 750 surface feet per minute; and
    frictionally engaging under a weld load said first and second workpieces to effect an inertia weld therebetween.

13. A method according to claim 12 wherein said first and second workpieces are stator components having average diameters in a range from about 10 inches to about 80 inches.

14. A method according to claim 13 further comprising imparting a unit energy input at said inertia weld in a range of about 25,000 to about 90,000 ft.-lb,/sq. in.

15. A method according to claim 14 wherein said first and second workpieces have a contact area, and said weld load is a product of said contact area and a weld stress within a range of about 25,000 to about 70,000 psi.

16. A method according to claim 13 effected using an inertia welding machine having a flywheel parameter being a product of flywheel weight and a radius of gyration squared; and further comprising:
   limiting a unit energy input at said inertia weld in a range of about 25,000 to about 90,000 ft.-lb./sq. in.;
   limiting said weld load to a product of a contact area between said first and second workpieces and a weld stress within a range of about 25,000 to about 70,000 psi; and
   rotating said first workpiece to an initial contact speed being a function of a product of said unit energy input and said contact area divided by said flywheel parameter.

17. A method of inertia welding together first and second, heat-resistant, nickel-based superalloy workpieces comprising:
   rotating said first workpiece to an initial contact speed greater than about 750 surface feet per minute and up to about 3000 surface feet per minute; and
   frictionally engaging under a weld load said first and second workpieces to effect an inertia weld therebetween.

18. A method according to claim 17 wherein said first and second workpieces are gas turbine engine hot section components.

19. A method according to claim 18 wherein said superalloy has a forging temperature range of about 200° F. below a melting temperature thereof.

20. A method according to claim 18 wherein said superalloy is selected from the group consisting of Inconel, Waspaloy, Hastelloy, and Rene.

* * * * *